United States Patent
Backhouse et al.

(10) Patent No.: US 12,208,598 B2
(45) Date of Patent: Jan. 28, 2025

(54) COMPOSITE LAMINATE AND A METHOD OF MANUFACTURING A COMPOSITE LAMINATE

(71) Applicant: ROLLS-ROYCE plc, London (GB)

(72) Inventors: Robert C. Backhouse, Wells (GB); Robert C. Worboys, Bristol (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 18/049,331

(22) Filed: Oct. 25, 2022

(65) Prior Publication Data

US 2023/0141859 A1    May 11, 2023

(30) Foreign Application Priority Data

Nov. 10, 2021 (GB) ...................... 2116113

(51) Int. Cl.
| | |
|---|---|
| *B32B 3/24* | (2006.01) |
| *B32B 3/08* | (2006.01) |
| *B32B 3/26* | (2006.01) |
| *B32B 9/00* | (2006.01) |
| *B32B 9/04* | (2006.01) |
| *B32B 37/18* | (2006.01) |

(52) U.S. Cl.
CPC ............... *B32B 3/266* (2013.01); *B32B 3/08* (2013.01); *B32B 9/007* (2013.01); *B32B 9/045* (2013.01); *B32B 37/185* (2013.01); *B32B 2305/08* (2013.01); *B32B 2305/22* (2013.01); *B32B 2307/732* (2013.01); *B32B 2313/04* (2013.01); *B32B 2603/00* (2013.01)

(58) Field of Classification Search
CPC ..................................................... B32B 3/266
See application file for complete search history.

(56) References Cited

U.S. PATENT DOCUMENTS

| | | | |
|---|---|---|---|
| 7,537,825 B1 | 5/2009 | Wardle et al. | |
| 8,257,678 B2 | 9/2012 | Steiner, III et al. | |
| 8,337,979 B2 | 12/2012 | Wardle et al. | |
| 10,343,372 B2 | 7/2019 | Hallander et al. | |
| 2020/0269522 A1* | 8/2020 | Blatherwick | B29C 70/028 |

(Continued)

FOREIGN PATENT DOCUMENTS

| | | |
|---|---|---|
| EP | 3000922 A1 | 3/2016 |
| EP | 3159157 A1 | 4/2017 |
| WO | 2015120011 A1 | 8/2015 |

(Continued)

OTHER PUBLICATIONS

European Search Report issued in EP Patent Application No. 22200993 dated Apr. 12, 2023.

(Continued)

*Primary Examiner* — William P Watkins, III
(74) *Attorney, Agent, or Firm* — Shumaker & Sieffert, P.A.

(57) ABSTRACT

A method of manufacturing a composite laminate. The method comprises providing a base layer, providing a discontinuous reinforcing patch on the base layer, and providing a top layer over the base layer and discontinuous reinforcing patch. Also, a composite laminate having a discontinuous reinforcing patch interposed between a base layer and a top layer. The discontinuous reinforcing patch comprises a patterned nanomaterial layer with nanomaterial-filled zones and vacant zones.

19 Claims, 8 Drawing Sheets

(56) References Cited

U.S. PATENT DOCUMENTS

2020/0324524 A1 10/2020 Liou et al.
2022/0250338 A1 8/2022 Fromonteil et al.

FOREIGN PATENT DOCUMENTS

WO 2018206939 A1 11/2018
WO 2020260804 A1 12/2020

OTHER PUBLICATIONS

Great Britain search report dated May 9, 2022, issued in GB Patent Application No. 2116113.8.
Worboys, R.C., "Suppressing Delamination Through Vertically Aligned Carbon Nanotubes (VACNT) Interleaves," Oct. 2019, retrieved from Explore Bristol Research, http://research-information.bristol.ac.uk on Oct. 17, 2022.
Response to Extended Search Report dated Apr. 12, 2023, from counterpart European Application No. 22200993.8 filed Aug. 4, 2023, 47 pp.

\* cited by examiner

COMPOSITE LAMINATE AND A METHOD OF MANUFACTURING A COMPOSITE LAMINATE

CROSS-REFERENCE TO RELATED APPLICATIONS

This specification is based upon and claims the benefit of priority from United Kingdom patent application number GB 2116113.8 filed on Nov. 10, 2021, the entire contents of which is incorporated herein by reference.

BACKGROUND

Technical Field

The present disclosure relates to a composite laminate and a method of manufacturing said laminate, where the composite laminate comprises an interlayer interposed between a base layer and a top layer. Furthermore, the present disclosure relates to a gas turbine engine component and method of manufacturing a gas turbine engine component that comprises a composite laminate with an interlayer.

Description of the Related Art

Composite materials, e.g. fibrous reinforcements in a matrix resin, compete with metallic materials in many engineering applications. Their properties are defined by the fibre and matrix selection, as well as the 'architecture' of how the fibres are arranged to manage imposed loads and control the progression of failure in catastrophic events. Unless the progressive failure behaviour is engineered into the constituent materials and fibre architecture, the materials will typically exhibit linear-elastic stress-strain response until failure, which in some applications may be undesirable.

Known laminated composites that are manufactured from pre-impregnated materials (prepreg) or dry laminated reinforcements, e.g. non-crimp fabrics (NCF), may typically include engineered interlayers between the plies. These interlayers may comprise thermoplastic polymer/co-polymer particles, non-woven veils or films. The purpose of these interlayer components are to (i) increase the interlaminar distance between plies (so as to enable the formation of a controlled 'plastic zone' for visco-plastic work of fracture to develop) and (ii) provide obstacles to delamination crack progression though bridging, elastic/plastic deformation and/or cavitation.

Other known interlayers may comprise nanoscale additives of various forms, e.g. carbon-based, silica-based and nanoclay additives, which create a more tortuous crack path at the interlaminar region, which in turn increases the work of fracture for interlaminar delaminations.

U.S. Pat. No. 7,537,825 B1 discloses a nano-engineered material architecture with an interlayer formed of nanoscale additives. The architecture includes a first composite ply with fibrous reinforcement oriented at a first orientation and a second composite ply with fibrous reinforcement oriented at a second orientation. The architecture also includes a carbon nanotube (CNT) film layer with aligned CNTs extending from a bottom surface of the film layer to a top surface of the film layer (an arrangement known in the field as vertically aligned carbon nanotubes, or VACNTs). The CNT film layer is arranged between and in an abutting relationship with the first and second composite plies. Accordingly, the CNTs of the CNT film layer act as a penetrating bridge across the interface between the first and second composite plies.

U.S. Pat. No. 8,337,979 B2 discloses a nanostructure-reinforced composite article and methods related to the formation of the article. In some cases, nanostructures, such as carbon nanotubes are uniformly grown on the surface of a substrate such that a longitudinal axis of the nanostructures is substantially aligned normal to the substrate surface. The nanostructures are then transferred to a surface of a ply (by applying heat, pressure and/or some other sources of external energy) during an intermediate stage in the composite laminate layup process in order to enhance the mechanical, thermal and/or electrical properties of the composite article at the interface between two plies.

Figure 1:
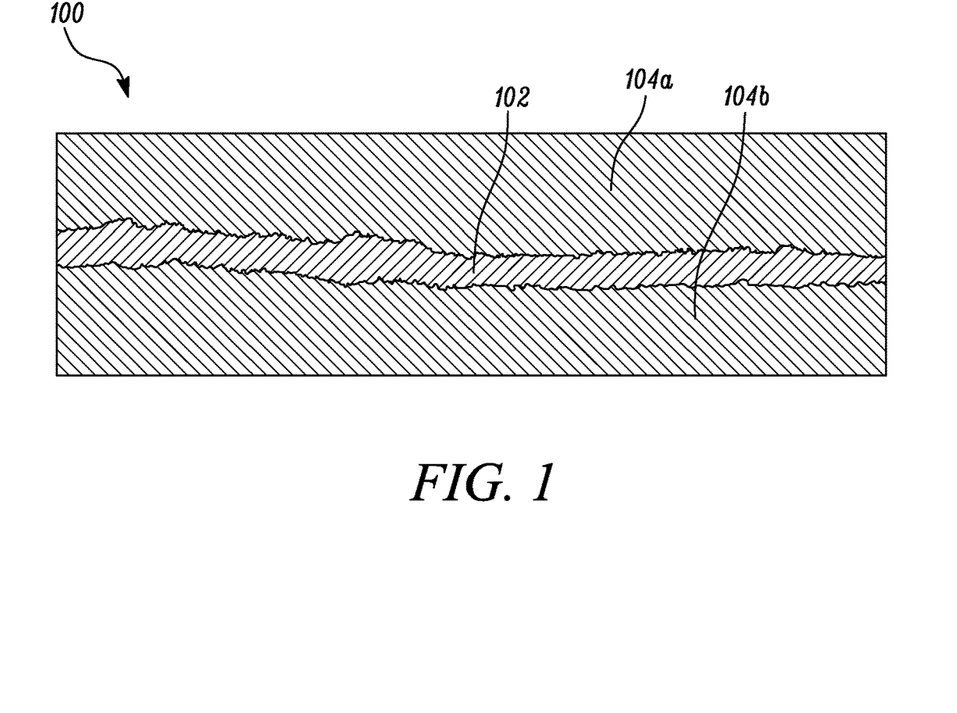
FIG. 1 is a microscope image of a fractured composite laminate without a continuous CNT interlayer, the image showing predominantly interlaminar fracture behaviour.
Figure 2:
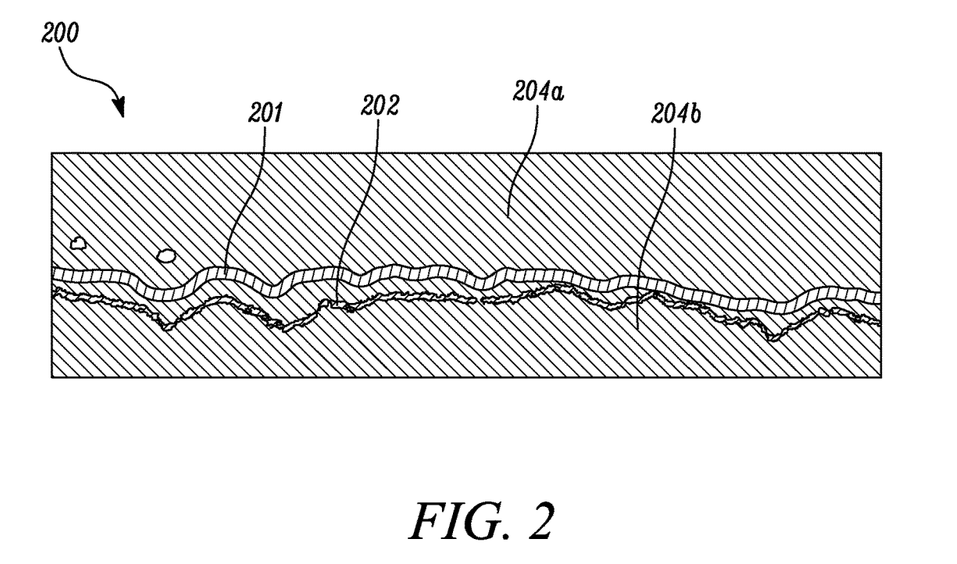
FIG. 2 is an electron microscope image of a fractured composite laminate with a continuous CNT interlayer, the image showing predominantly intralaminar fracture behaviour.

Through an investigation performed by the inventors, it has been identified that uniformly distributed vertically aligned CNT forest interlayers placed in advance of a propagating 'interlaminar' (between plies) delamination crack, result in crack deflection into the 'infralaminar' (within a ply) region or into adjacent plies where/if the VACNT material is not present at the interface. For instance, FIG. 1 shows a microscope image of a fractured composite laminate 100 without a CNT forest interlayer. The failure mode of this non-interlayered laminate can be seen to be dominated by interlaminar delamination, i.e. the crack 102 propagates along the interface between adjacent plies 104a, 104b. In contrast, FIG. 2 shows an electron microscope image of a fractured composite laminate 200 with a CNT forest interlayer 201 arranged between a first ply 204a and a second ply 204b. From this image, it is observed that the CNT forest interlayer induces a propagating crack 202 to deflect into the second ply 204b, i.e. the crack 202 propagates as an intralaminar (within the ply) crack.

While crack deflection into the intralaminar region was found to provide 'modest' work of fracture by creating a tortuous crack path, some fibre bridging and infrequent VACNT pull out, the increases in the work of fracture was found to be far lower than would be expected and desired from 'progressive' tensile or transverse fracture of VACNTs, i.e. crack propagation through the aligned CNT forest itself. Therefore, there is a need provide a composite laminate with a CNT interlayer that does not cause crack deflection into the intralaminar region, and instead encourages the crack to remain within the interlaminar region.

The following disclosure was devised considering this issue.

SUMMARY

According to a first aspect there is provided a composite laminate that comprises a base layer and a top layer (also known as base and top plies) that are formed from a polymeric material, and a discontinuous reinforcing patch arranged in the interlaminar region between the base layer and top layer. This discontinuous reinforcing patch comprises a discontinuous patterned nanomaterial layer, which includes at least one nanomaterial-filled zone and at least one vacant zone.

By providing a discontinuous patch comprising a patterned nanomaterial layer with at least one nanomaterial-filled zone and at least one vacant zone, interlaminar cracks that propagate past the reinforcing patch are encouraged to remain within the interlaminar region rather than deflect into the intralaminar region. This is because the patch provides areas that are substantially free of nanomaterial reinforcement (i.e. the vacant zone), and so promote local plastic interlaminar failure therein. Accordingly, since the propagating crack is more likely to remain in the interlaminar region, there is an increased likelihood that nanomaterial fracture mechanisms that dissipate high amounts of energy, e.g. rupture, pull-out and crack pinning, occur as the crack passes the reinforcing patch. This in turn will result in the interlaminar fracture toughness of the laminate according to the present disclosure being greater than a laminate that includes a continuous reinforcing patch, i.e. an interlayer patch with nanomaterials uniformly arranged throughout.

The term "nanomaterial" is used herein to describe materials manufactured at the nanoscale. Examples of nanomaterials may include nanotubes (e.g. carbon nanotubes (CNTs), silica nanotubes, BCN nanotubes, etc.), planar nanostructures (e.g. graphene, graphene oxide, boron nitride platelets, etc.) and nanospheres. It should be appreciated that the term nanomaterials may include a combination of nanotubes, planar nanostructures and/or nanospheres.

The term "nanomaterial-filled zone" is used herein to describe a region occupied by nanomaterials (i.e. in which nanomaterials are continuously arranged to 'fill' the nanomaterial-filled zone), whilst the term "vacant zone" is used to describe a region that is free from, or at least substantially free from, nanomaterials. For the avoidance of doubt, the at least one vacant zone may, in some cases, not be completely free of nanomaterials. As should be appreciated, nanomaterial contaminants (e.g. partially removed nanomaterials, or nanomaterials that are unavoidably present), may be present in the vacant zone.

In the context of the reinforcing patch, the term 'discontinuous' relates to the nanomaterial-filled zone(s) and vacant zone(s) forming a patterned arrangement on the base layer. This is different to a 'continuous' reinforcing patch, which does not include any vacant zone(s) and instead exclusively includes a single nanomaterial-filled zone occupying the whole patch.

Optional features of the first aspect will now be set out. These are applicable singly or in any combination with any aspect or embodiment.

In some embodiments, the total area occupied by the nanomaterial-filled zone(s) may be greater than or equal to 30%, or 40%, or 50%, or 60%, or 70%, or 80%, or 90% of the area of the discontinuous reinforcing patch.

In some embodiments, the discontinuous patterned nanomaterial layer may comprise nanotubes. In such embodiments, each nanotube in the nanomaterial-filled zone(s) may have a circular or elliptical transverse cross-section. In this way, each nanotube may have a tubular shape. Each nanotube may have a (generally longitudinally extending) central axis, which is defined by the centroids of the transverse cross-sections of the nanotube. In some embodiments, the central axis may be linear (i.e. straight), while in other embodiments, the central axis may be non-linear (e.g. curved/wavy). For example, in some cases nanotubes may buckle during formation of the laminate (so as have a curved/wavy shape). Each nanotube may have an actual length and a chord length. The actual length may be the length of the nanotube taken along the central axis. The chord length may be the length of a straight line extending between opposite (i.e. longitudinal) ends of the nanotube. For a linear nanotube, the actual length and the chord length will be the same. For a curved nanotube, the actual length will be larger than the chord length. References below to "length" (in the context of the nanotubes) are references to the actual length.

The average length of the nanotubes in the nanomaterial-filled zone(s) may be between and include 5 μm to 60 μm.

In some embodiments, the average length may be at least 1 μm, 2 μm, at least 3 μm, at least 4 μm, at least 5 μm, at least 6 μm, at least 7 μm, at least 8 μm or at least 9 μm. In some embodiments, the average length may be less than or equal to 60 μm, less than or equal to 50 μm, less than or equal to 45 μm, less than or equal to 40 μm, less than or equal to 35 μm, less than or equal to 30 μm, less than or equal to 25 μm, less than or equal to 20 μm, less than or equal to 15 μm or less than or equal to 10 μm. Accordingly, in some embodiments, the average length of the CNTs in the nanomaterial-filled zone(s) may be between and include 1 μm to 60 μm, 2 μm to 50 μm, 3 μm to 40 μm, 4 μm to 30 μm, 5 μm to 20 μm or 6 μm to 10 μm.

The reference to an 'average' length of the nanotubes is made due to possible inconsistencies in the length of each nanotube when manufactured and/or processed.

In some embodiments, the nanotubes may be aligned with each other in the nanomaterial-filled zone(s). In other words, each nanotube in the nanomaterial-filled zone(s) may be approximately parallel with each other nanotube in the nanomaterial-filled zone(s). In such embodiments, the nanotubes in the nanomaterial-filled zone(s) may form a nanoforest. In some embodiments, the nanotubes may be vertically aligned (i.e. when the base and top layers are arranged horizontally), i.e. the nanotubes may be aligned such that the central axes of the nanotubes are approximately perpendicular to the planar base and top layers. The nanotubes therefore may extend in a vertical direction to bridge the interlaminar region between the base and top layer (i.e. when the base and top layers are arranged horizontally). As should be appreciated, the average length of the nanotubes may preferably be greater than or equal to an interlaminar distance between the base and top layer.

In some embodiments, the discontinuous patterned nanomaterial layer may be formed of carbon. In some embodiments, the discontinuous patterned nanomaterial layer may comprise carbon nanotubes (CNTs), i.e. the nanotubes described herein may be CNTs.

In some embodiments, the patch may comprise a plurality of nanomaterial-filled zones that are discretely arranged and each nanomaterial-filled zone may be surrounded by an interconnecting vacant zone. In such embodiments, the nanomaterial-filled zones may be in the form of islands of nanomaterial clusters, which are separated from one another by the vacant (nanomaterial free) zone. At least one of the nanomaterial-filled zones may have an irregular shape, i.e. the periphery of the at least one nanomaterial-filled zone may define a shape with sides of different lengths and/or corners with different internal angles. In some embodiments each of the nanomaterial-filled zones may have an irregular shape. Alternatively or additionally, at least one of the nanomaterial-filled zones (or each nanomaterial-filled zone) may have a regular polygon shape, such as e.g. a triangle, square, pentagon, hexagon, heptagon, octagon, circle, etc.

In other embodiments, the patch may comprise a plurality of vacant zones that are discretely arranged and each vacant zone may be surrounded by an interconnecting nanomaterial-filled zone (i.e. the reverse pattern of the above described arrangement having discrete nanomaterial islands). In such embodiments, at least one of the vacant zones may have an irregular shape (as described above). Alternatively or additionally, at least one of the vacant zones may have a shape that is a regular polygon, e.g. triangle, square, pentagon, hexagon, heptagon, octagon, circle, etc.

In some embodiments, the nanomaterial-filled zone(s) and vacant zone(s) may form an irregular pattern. The term "irregular pattern" as described herein refers to a pattern which has no periodic characteristics in any given direction. In other words, in such embodiments, the distribution of the nanomaterial-filled zone(s) and vacant zone(s) may not be systematic, but may instead be random or quasi-random. For example, in some embodiments, the nanomaterial-filled zone(s) may be randomly or quasi-randomly distributed on the base layer and surrounded by the vacant zone(s). Alternatively, the vacant zone(s) may be randomly or quasi-randomly distributed on the base layer and surrounded by the nanomaterial-filled zone(s).

In other embodiments, the nanomaterial-filled zone(s) and vacant zone(s) may form a uniform pattern, i.e. the nanomaterial-filled zone(s) and vacant zone(s) of the reinforcing patch may be distributed on the base layer, so as to repeat in a periodic manner in at least one direction. For example, the nanomaterial-filled zone(s) and vacant zone(s) may be arranged in a chequerboard pattern, stripe pattern, chevron pattern, and/or any other repeating pattern that provides mechanical or physical benefit to the laminate.

The nanomaterial-filled zone(s) and vacant zone(s) may be sized to promote nanomaterial fracture and pull-out at the nanomaterial-filled zone(s), as well as plastic-zone development and progressive matrix failure at the vacant zone(s). The nanomaterial-filled zone(s) may include a minimum length dimension in the primary plane of the patterned carbon nanotube layer (i.e. the interfacial plane between the base and top layer). The minimum length dimension of a nanomaterial-filled zone is defined as the length of the shortest line between two points on the periphery of the nanomaterial-filled zone, which passes through the centroid of the nanomaterial-filled zone. In some embodiments, the minimum length dimension of the nanomaterial-filled zone(s) may be at least as large as the Mode II fracture process zone length of the polymeric material used for either the base or top layer. In some embodiments, the minimum length dimension of the nanomaterial-filled zone may be at least 1 mm, at least 2 mm, at least 3 mm, at least 4 mm, at least 5 mm, at least 6 mm, at least 7 mm, at least 8 mm, at least 9 mm, or at least 10 mm. In some embodiments, the minimum length dimension of the nanomaterial-filled zone may be less than or equal to 100 mm, 90 mm, 80 mm, 70 mm, 60 mm, 50 mm, 40 mm, 30 mm, 20 mm, or 10 mm.

In some embodiments, the discontinuous reinforcing patch may further include a polymer film. The polymer film may be formulated such that it is stable and handleable at room temperature. The polymer film may comprise at least one thermoset or thermo-plastic from the group including of polyesters, acrylics, polycarbonates, epoxies, phenolics, polyurethanes, vinyl esters, bismaleimides, cyanate esters, bismaleimide-triazines, polyimides, phthalonitriles, and polyphosphazenes. The film may comprise a formulated blend of constituents including soluble or insoluble elastomeric polymer constituents that modify the thermal, physical and mechanical performance of the polymer film. In some embodiments, the polymer film comprises the same polymer(s) as that in the polymeric material of the base and/or top layer. In other embodiments, the polymer file includes a different polymer to that of the polymeric material of the base and/or top layer.

In some embodiments, nanomaterials in the nanomaterial-filled zone(s) may be partially embedded in the polymer film. In these cases, a portion of each of the nanomaterials may not be covered by the polymer film and therefore some of each of the nanomaterials may be exposed. In other embodiments, the nanomaterials in the nanomaterial-filled zone(s) may be fully embedded in the polymer film. Advantageously, the polymer film may prevent raw nanomaterials from releasing into the atmosphere and becoming hazardous through ingestion or inhalation. Furthermore, the polymer film may facilitate the provision of the reinforcing patch on the base layer by providing a tacky surface which supports the nanomaterials during the fabrication process.

In some embodiments, the polymer film may have a film thickness between and including 5 μm to 60 μm. In some embodiments, the film thickness may be at least 1 μm, at least 2 μm, at least 3 μm, at least 4 μm, at least 5 μm, at least 6 μm, at least 7 μm, at least 8 μm or at least 9 μm. In some embodiments, the film thickness may be less than or equal to 60 μm, less than or equal to 50 μm, less than or equal to 45 μm, less than or equal to 40 μm, less than or equal to 35 μm, less than or equal to 30 μm, less than or equal to 25 μm, less than or equal to 20 μm, less than or equal to 15 μm or less than or equal to 10 μm. Accordingly, in some embodiments, the film thickness may be between and include 1 μm to 60 μm, 2 μm to 50 μm, 3 μm to 40 μm, 4 μm to 30 μm, 5 μm to 20 μm or 6 μm to 10 μm.

In some embodiments, the reinforcing patch may be substantially rectangular in the primary plane of the patterned nanomaterial layer, i.e. the interfacial plane between the base and top layer. The reinforcing patch may have four edges comprising two parallel side edges, and parallel top and bottom edges. In some embodiments, the patch may have more than four edges and/or at least one of the edges may be curved. In some embodiments, at least one of edges may have a length greater than or equal to 5 mm, greater than or equal to 10 mm, greater than or equal to 20 mm, greater than or equal to 30 mm, greater than or equal to 40 mm, greater than or equal to 50 mm, greater than or equal to 60 mm, greater than or equal to 70 mm, greater than or equal to 80 mm, greater than or equal to 90 mm, or greater than or equal to 100 mm. In some embodiments, at least one of the edges may have a length that is less than or equal to 500 mm, less than or equal to 450 mm, less than or equal to 400 mm, less than or equal to 350 mm, less than or equal to 300 mm, less than or equal to 250 mm, less than or equal to 200 mm, less than or equal to 150 mm, or less than or equal to 100 mm.

In some embodiments, the nanomaterial-filled zone(s) may substantially define the edges of the discontinuous reinforcing patch.

In some embodiments, the polymeric material from which the base layer and the top layer are made may include a thermoset material. Such a thermoset material may comprise one or more from the group including polyesters, acrylics, polycarbonates, epoxies, phenolics, polyurethanes, polyimides, vinyl esters, bismaleimides, cyanate esters, bismaleimide-triazines, polyimides, phthalonitriles, and polyphosphazenes. In some embodiments, the base layer and the top layer are made of the same polymeric material. In other embodiments, the base layer and top layer are made of different polymeric materials. In some embodiments, the polymeric material may be a fibre reinforced polymer material (FRP) and may be a prepreg material. In some embodiments, the fibre reinforcement of the FRP may be formed from carbon, glass, aramid, or other high tenacity materials used to manufacture composite components.

In some embodiments the laminate may only have two layers (i.e. may consist of two layers), specifically the base layer and the top layer. In other embodiments, the laminate may have more than two layers. In such embodiments further discontinuous reinforcing patch may be arranged between each of the further layers (i.e. those in addition to the base and top layers), or may be arranged at the interface between every other layer, every third layer, every fourth layer, etc.

According to a second aspect there is provided a method of manufacturing a composite laminate. This method comprises the provision of a base layer formed from polymeric material, and the provision of a discontinuous reinforcing patch on the base layer. The method further comprises providing a top layer over the base layer and discontinuous reinforcing patch such that the discontinuous reinforcing patch is arranged between the base layer and the top layer, wherein the discontinuous reinforcing patch comprises a patterned nanomaterial layer having at least one nanomaterial-filled zone and at least one vacant zone.

Optional features of the second aspect will now be set out. These are applicable singly or in any combination with any aspect or embodiment.

In some embodiments, the method may further include growing the discontinuous reinforcing patch on a substrate. The discontinuous reinforcing patch on the substrate may then be provided on the base layer by transferring the discontinuous reinforcing patch from the substrate to the base layer. In some embodiments, the discontinuous reinforcing patch may be grown on a substrate through first providing a discontinuous catalyst coating on the substrate. Examples of such a catalyst coating may comprise nickel, iron, and/or cobalt. In some embodiments, the coated substrate may then be used with a nanomaterial growth process, e.g. combustion chemical vapour deposition (CCVD), where the catalyst coating promotes localised nanomaterial growth (e.g. CNT growth). Accordingly, the pattern of the catalyst coating on the substrate may correspond to the pattern of the discontinuous reinforcing patch, with catalyst coated areas corresponding to the nanomaterial-filled zones and non-coated areas corresponding to the vacant zones. In some embodiments, the discontinuous reinforcing patch grown on the substrate may be transferred on to the base layer through pressing the nanomaterial against the surface of the base layer. The pressing force can be applied using rollers, weights or debulking the base layer with the discontinuous reinforcing patch arranged thereon. Heat may also be used to facilitate the transfer process. Alternatively or additionally, the discontinuous reinforcing patch may be transferred on to the base layer by using an automated fibre placement (AFP) process.

In other embodiments, the method may further include providing a continuous reinforcing patch, and processing the continuous reinforcing patch to form the discontinuous reinforcing patch. The continuous reinforcing patch may comprise a uniform nanomaterial layer where nanomaterials occupy the entire patch, i.e. the continuous reinforcing patch has a single nanomaterial-filled zone and no vacant zone(s).

The continuous reinforcing patch may be provided and processed to form the discontinuous reinforcing patch prior to providing the discontinuous reinforcing patch on the base layer. In other words, the continuous reinforcing patch may be provided and processed away from the base layer to form the discontinuous reinforcing patch, and then the (processed) discontinuous reinforcing patch may be transferred on to the base layer. Alternatively, the continuous reinforcing patch may be provided and processed on the base layer to form the discontinuous reinforcing patch in situ on the base layer.

An example of 'processing' the continuous reinforcing patch to form a discontinuous reinforcing patch may include etching and/or ablation. For instance, in some embodiments, a continuous reinforcing patch may be first provided on the base layer and then in a subsequent step, the continuous reinforcing patch may be partially etched or ablated off the base layer to form the vacant zone(s). The areas of the continuous reinforcing patch that are not etched or ablated off the base layer may form the nanomaterial-filled zone(s). In other embodiments, the continuous reinforced patch may be etched or ablated before then being transferred on the base layer. For instance, the continuous reinforcing patch may be first provided on a substrate, and then partially etched or ablated off the substrate to form a discontinuous reinforcing patch on the substrate. The discontinuous reinforcing patch may then be transferred to the base layer by, for example, pressing the discontinuous reinforcing patch on to the base layer. Such etching and/or ablation methods may be carried out using lasers, chemicals, etc. Alternatively or additionally to etching and/or ablation, nanomaterial may be removed from the continuous reinforcing patch by cutting out nanomaterials to form the vacant zones, e.g. by die cutting, blade cutting, etc.

Another example of 'processing' a continuous reinforcing patch to form a discontinuous reinforcing patch may include the use of a masking film (i.e. a stencil) to partially inhibit the transfer of a continuous reinforcing patch on to the base layer. In such embodiments, the masking film may include a discontinuous cut-out therethrough and may be provided on the base layer. Subsequently, a continuous reinforcing patch may be pressed onto the masking film, specifically, at the location of the masking film which includes the discontinuous cut-out. In doing so, the nanomaterials of the continuous reinforcing patch that are located within the discontinuous cut-out region may pass through the masking film and onto the base layer, where they adhere and transfer on to the base layer. Contrastingly, nanomaterials that are located outside the discontinuous cut-out region may be impeded by the masking film and may be therefore prevented from transferring on to the base layer. Accordingly, when the masking film is later removed from the base layer, only the nanomaterials that transferred through the discontinuous cut-out remain deposited on the base layer. The discontinuous cut-out of the masking film may therefore define the nanomaterial-filled zone(s) on the base layer.

The masking film may be formed from a material that does not chemically bond to the base layer when pressed or heated. In some embodiments, the masking film may be formed from fluorinated ethylene propylene (FEP) release film. Preferably, at least for nanomaterials comprising vertically aligned nanotubes, the masking film has a thickness that is less than or equal to the average length of the nanotubes of the continuous reinforcing patch. This ensures that the nanotubes that pass through the masking film contact the base layer without losing alignment or being damaged, e.g. through excess pressing force or bending of the continuous reinforcing patch during transfer onto the base layer.

Another example of 'processing' a continuous reinforcing patch to form a discontinuous reinforcing patch may include pressing a continuous patch onto a base layer using an embossed press (e.g. a roller, die, and/or stamp). The embossed press may include at least one raised area and at least one recessed area. The raised area(s) may provide localised pressure on the continuous reinforcing patch when the embossed press is used. This localised pressure may result in nanomaterials (at the raised areas) being transferred from the continuous reinforcing patch and on to the base layer. Furthermore, the recessed area(s) may provide no localised pressure on the continuous reinforcing patch when the embossed press is used. Therefore, nanomaterials (located at the recessed areas) may not be transferred from the continuous reinforcing patch to the base layer. In this way, when an embossed press is employed to deposit a discontinuous reinforcing patch on to a base layer, the raised area(s) may define the nanomaterial-filled zone(s) and the recessed area(s) may define the vacant zone(s).

In some embodiments, the provision of a discontinuous reinforcing patch may comprise the provision of a discontinuous reinforcing patch with a plurality of discrete nanomaterial-filled zones surrounded by an interconnecting vacant zone. In other embodiments, the provision of a discontinuous reinforcing patch may comprise the provision of a discontinuous reinforcing patch with a plurality of discrete vacant zones surrounded by an interconnecting nanomaterial-filled zone. At least one of the nanomaterial-filled zone(s) and/or at least one of the vacant zone(s) may have an irregular shape (as described previously). Alternatively or additionally, at least one of the nanomaterial-filled zone(s)/vacant zone(s) may have a shape that is a regular polygon, e.g. triangle, square, pentagon, hexagon, heptagon, octagon, circle, etc. The at least one nanomaterial-filled zone(s) and/or vacant zone(s) may be distributed randomly, quasi-randomly or uniformly within the discontinuous reinforcing patch.

According to a third aspect, there is provided a composite laminate formed by the method according to the second aspect of the present disclosure.

According to a fourth aspect, there is provided a component comprising the composite laminate according to the first aspect of the present disclosure. In some embodiments, the component may be a gas turbine engine component. Examples of such gas turbine engine components may include fan blades, nacelles, turbine blades, compressor blades, stator vanes, engine structures, flanged ducts, drive shafts and/or others. In other embodiments, the component may be a general engineering component. The general engineering component may not necessarily be found in or around a gas turbine engine. For example, the general engineering component may comprise a composite pressure vessel, pipe system, permanent magnet retention banding, mechanical shafts, rotor hubs and/or others.

According to a fifth aspect, there is provided a method of manufacturing a component according to the fourth aspect, wherein this method comprises the method according to the second aspect of the present disclosure.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 3:
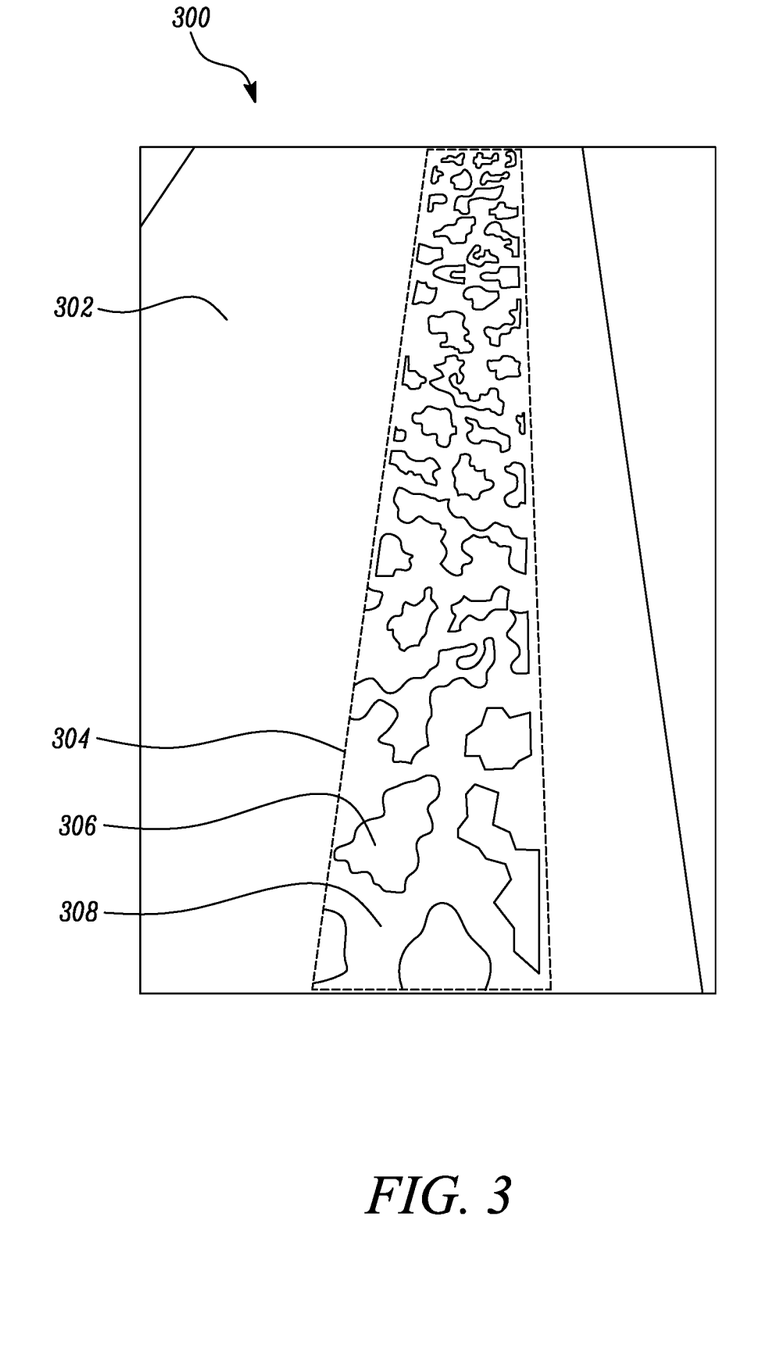
FIG. 3 is a top perspective view of a partly formed composite laminate according to the present disclosure.

FIG. 3 illustrates a composite laminate 300 comprising a base layer 302 formed from a polymeric material, specifically HexTow® IM7/HexPly® 8552 prepreg carbon fibre reinforced polymer. The laminate 300 includes a discontinuous reinforcing patch 304 on the surface of the base layer 302. The discontinuous reinforcing patch 304 covers a rectangular area on the surface of the base layer (delimited by the dashed lines). The discontinuous reinforcing patch 304 comprises a patterned nanomaterial interlayer that includes nanomaterial-filled zones 306 and a vacant zone 308. In practice, a polymeric top layer (not shown) is provided over the base layer 302 and discontinuous reinforcing patch 304 so that the discontinuous reinforcing patch 304 interposes the base layer 302 and top layer. The discontinuous reinforcing patch 304 therefore provides interlaminar reinforcement for the base layer 302 and top layer when present.

The nanomaterial-filled zones 306 are occupied by nanomaterials, specifically, carbon nanotubes (CNTs), which are aligned in a vertical direction to bridge the interlaminar region between the base layer 302 and top layer. The CNTs in the nanomaterial-filled zones 306 therefore form a nanoforest that connects the base layer 302 and top layer when assembled.

Figure 4A:
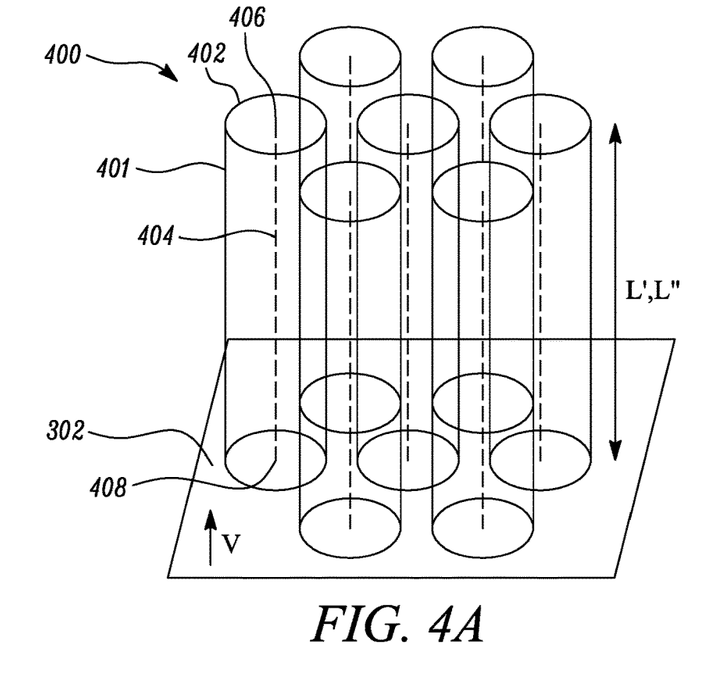
FIG. 4A shows a diagram of vertically aligned carbon nanotubes.

A diagrammatic representation of vertically aligned CNTs 400 is illustrated in FIG. 4A. In the illustrated embodiment each CNT 401 has a generally circular transverse cross-section 402 that extends in a longitudinal direction to form a tubular shape (in other embodiments the cross-section 402 may be elliptical). Each CNT 401 has a central axis 404, a first end 406 and a second end 408. The central axis is defined by the centroid of all the transverse cross-sections 402 of the CNT. Within the nanomaterial-filled zones 306, the CNTs are aligned such that the central axis 404 of each CNT 401 is approximately parallel with the other CNTs in the nanomaterial-filled zone 306. The direction of the alignment (i.e. the vertical direction, V) corresponds to a direction perpendicular to the planar base layer 302 and top layer. In other words, the central axes 404 of the CNTs are approximately perpendicular to the surface of the base layer 302.

Figure 4B:
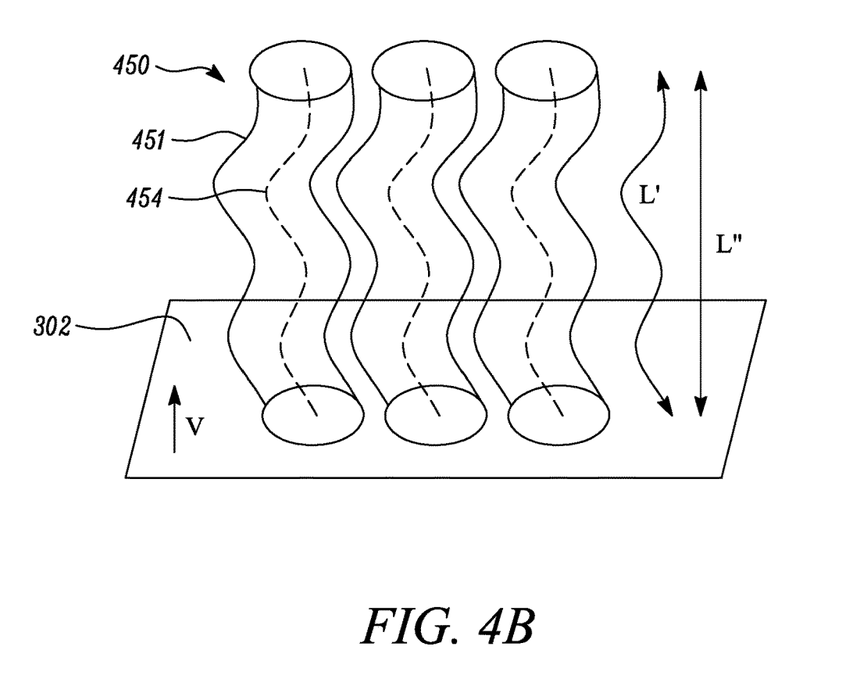
FIG. 4B shows a diagram of vertically aligned carbon nanotubes that have buckled.

Each CNT 401 has an actual length, L' and a chord length, L". The actual length, L' is the length of the CNT 401 taken along the central axis 404. The chord length is the length of a straight line extending between opposite (i.e. longitudinal) ends of the CNT 401. For a linear CNT 401, the actual length, L' and the chord length, L" will be the same (see FIG. 4A). For a curved CNT 451 (as shown in FIG. 4B), the actual length, L' will be larger than the chord length, L". For example, in some instances vertically aligned CNTs can buckle during fabrication of the composite laminate. A diagrammatic representation of vertically aligned 'buckled' CNTs 450 is shown in FIG. 4B. While CNT buckling effectively shortens the chord length, L" of the CNTs in the vertical direction, V by adding curvature to the central axis 454, the actual length, L' of the CNT is unaffected. The average ('actual') length, L' of the CNTs in the nanomaterial-filled zones 306 is therefore independent of any CNT buckling behaviour. The average ('actual') length, L' of the CNTs in the nanomaterial-filled zones 306 is between 11 μm to 15 μm.

Turning back to FIG. 3, the vacant zone 308 consists of areas of the discontinuous reinforcing patch 302 that are substantially free from CNTs. Accordingly, at the vacant zone 308, the base layer 302 and top layer are joined by bonding of their constituent polymeric materials only.

The nanomaterial-filled zones 306 of the reinforcing patch 304 are arranged to form discrete islands of vertically aligned CNTs that are surrounded by an interconnecting vacant zone 308. The nanomaterial-filled zones 306 each have an irregular shape (i.e. the edges of each zone have different lengths and the corners of each zone corners have different internal angles) and are quasi-randomly distributed within the area occupied by the reinforcing patch 304.

Figure 5A:
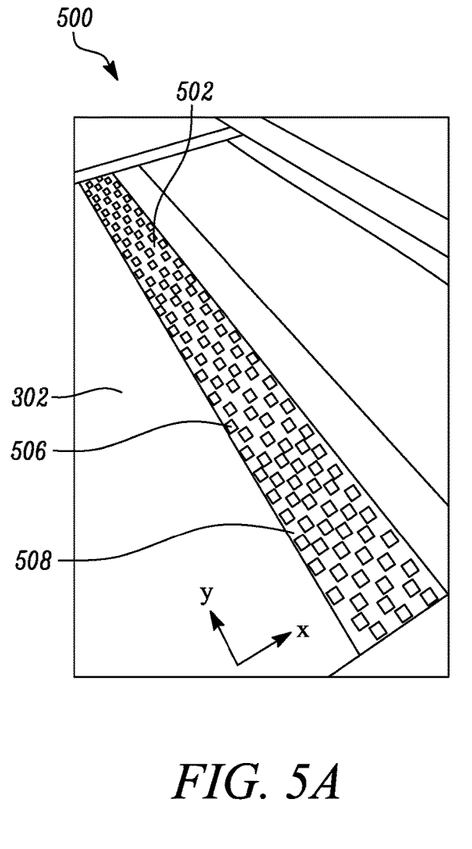
FIG. 5A is a top perspective view of a partly formed composite laminate with a discontinuous reinforcing patch comprising a chequered pattern.

Alternatively, the nanomaterial-filled zones 306 can be distributed in a uniform arrangement/pattern within the area occupied by the reinforcing patch 304. Examples of uniformly distributed nanomaterial-filled zones are shown in FIG. 5A (i.e. a laminate 500 with a chequerboard pattern 502) and FIG. 5B (i.e. a laminate 550 with a chevron pattern 552). The chequerboard pattern 502 consists of square nanomaterial-filled zones 506 and square vacant zones 508 that alternate in a direction across the length, y of the reinforcing patch, and also in a direction across the width, x of the reinforcing patch. The chevron pattern 552 consists of nanomaterial-filled zones 556 in the shape of zig-zags that extend along the entire length, y of the reinforcing patch. Each chevron nanomaterial-filled zone 556 is separated by a chevron vacant zone 556 with a similar zig-zag shape such that the nanomaterial-filled zone 556 and vacant zone 558 alternates across the width of the reinforcing patch, x. Accordingly, in both instances (chequerboard and chevron) the nanomaterial-filled zones 506/556 repeat periodically along a direction on the surface of the base layer 302.

An exemplary method 600 of manufacturing the composite laminate of the present disclosure will now be described. The method is shown as a flow chart in FIG. 6.

Figure 6:
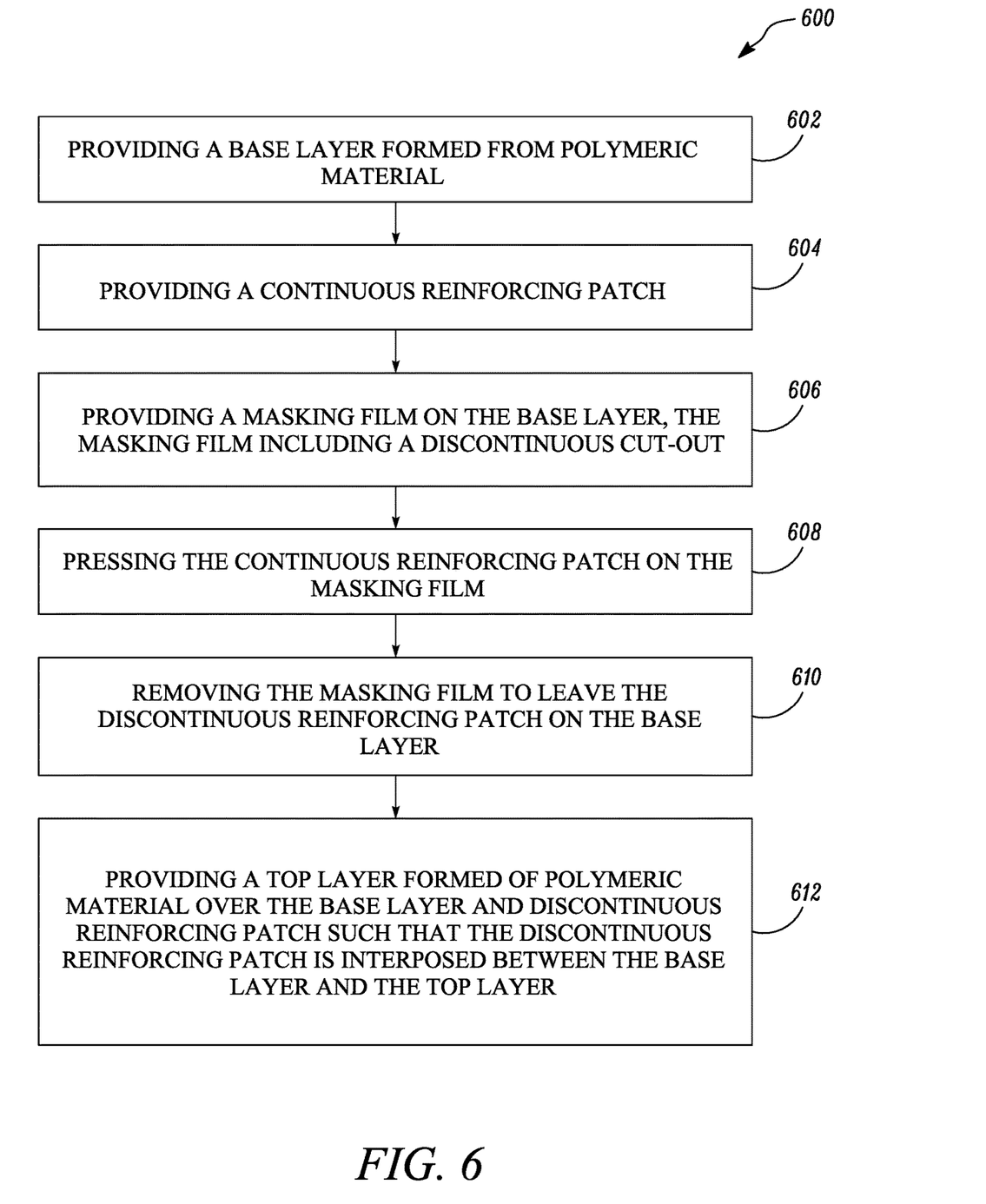
FIG. 6 is a flow chart of a method of manufacturing a composite laminate according to the present disclosure.

In a first step 602 of the method 600, a base layer 302 formed of a polymeric material (in the present case, HexTow® IM7/HexPly® 8552 prepreg) is provided.

Figure 7:
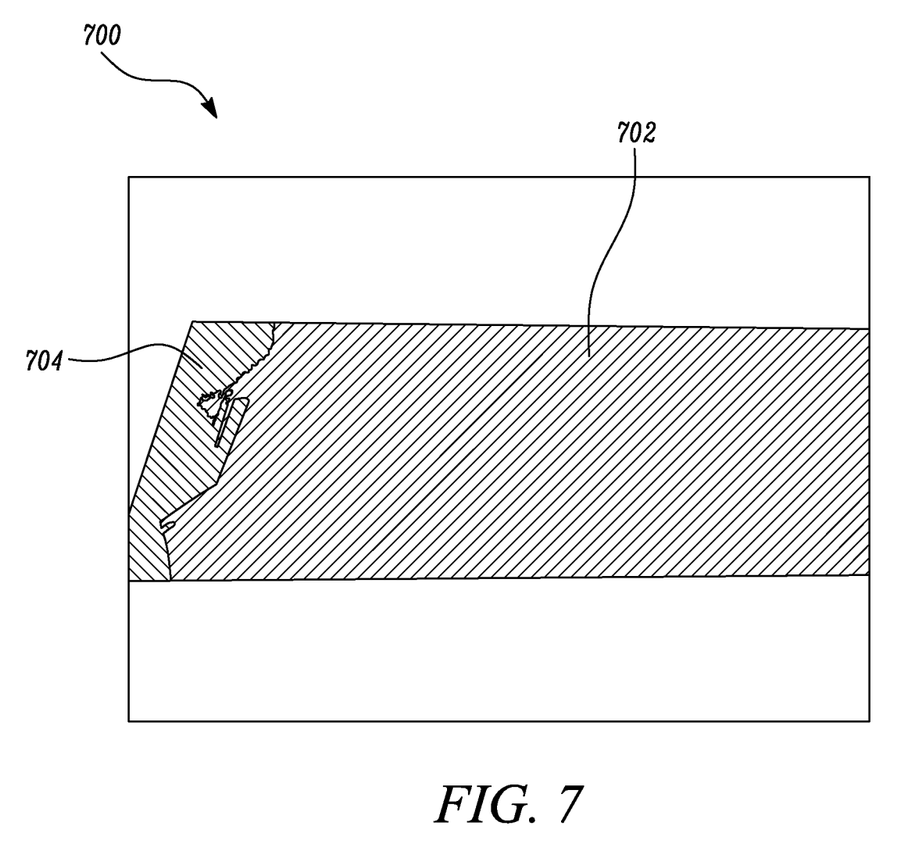
FIG. 7 is a top perspective view of a continuous reinforcing patch that is used in an embodiment of the present disclosure.

In the second step 604, a continuous reinforcing patch is provided. FIG. 7 shows an example of a continuous reinforcing patch 700. The patch 700 consists of uniformly arranged CNTs 702 that are vertically aligned. The CNTs are growth onto a substrate 704 using a conventional CNT growth method, e.g. combustion chemical vapour deposition. In the context of the continuous reinforcing patch, the term "vertically aligned" relates to the CNTs having longitudinal axes that extend approximately perpendicular to the surface of the substrate 704.

Figure 8A:
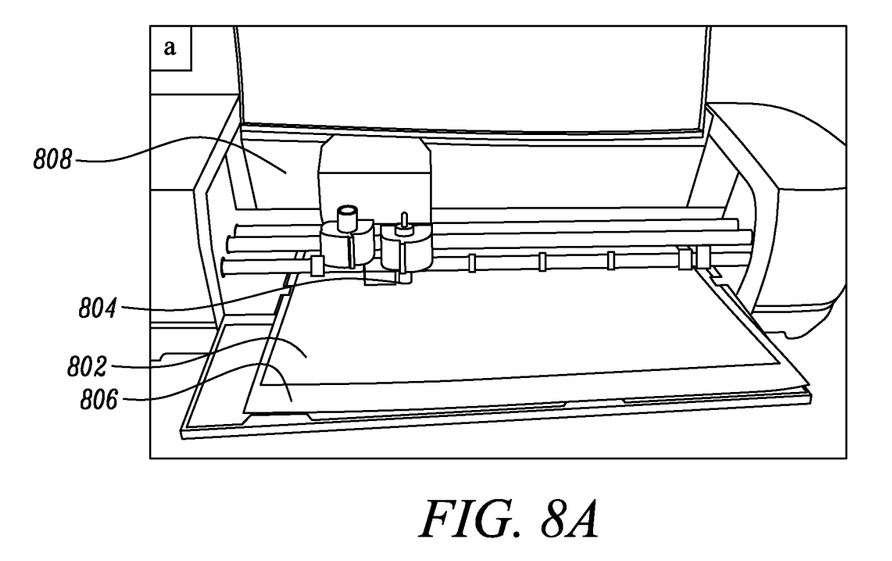
FIGS. 8A-8D shows photographs of the method steps for manufacturing a composite laminate according to the present disclosure. The steps including: providing a masking film with a discontinuous cut-out (FIG. 8A), providing a masking film on a base layer (FIG. 8B), providing a continuous reinforcing patch on the base layer (FIG. 8C), and pressing the continuous reinforcing patch on the masking film and base layer (FIG. 8D).
Figure 8B:
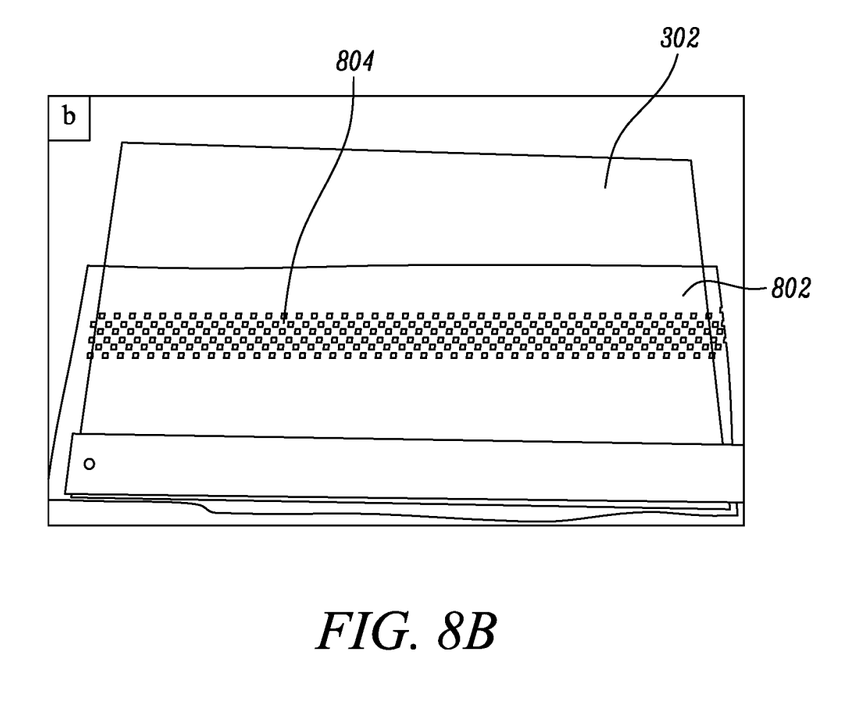

In the third step 606, a masking film 802 is provided on the base layer 302. The masking film 802 is formed from fluorinated ethylene propylene (FEP) release film and includes a discontinuous cut-out 804. The cut-out 804 is produced by adhering the masking film 802 to a cutting board 806 and programming a CNC machine 808 to cut a discontinuous cut-out shape from the masking film 802 (see FIG. 8A). The discontinuous cut-out 804 may be a uniform, random, or quasi-random pattern. Once the masking film 802 is cut by the CNC machine 808 to form the discontinuous cut-out 804, the masking film 802 is arranged on the surface of the base layer 302 at a location where interlaminar reinforcement is required (see FIG. 8B).

Figure 8C:
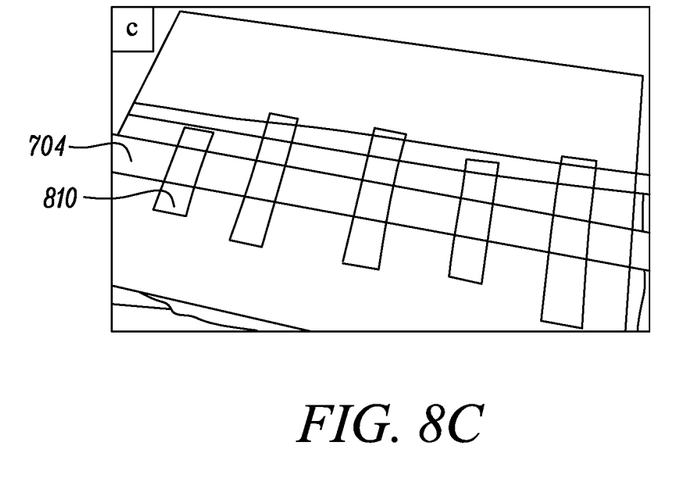
Figure 8D:
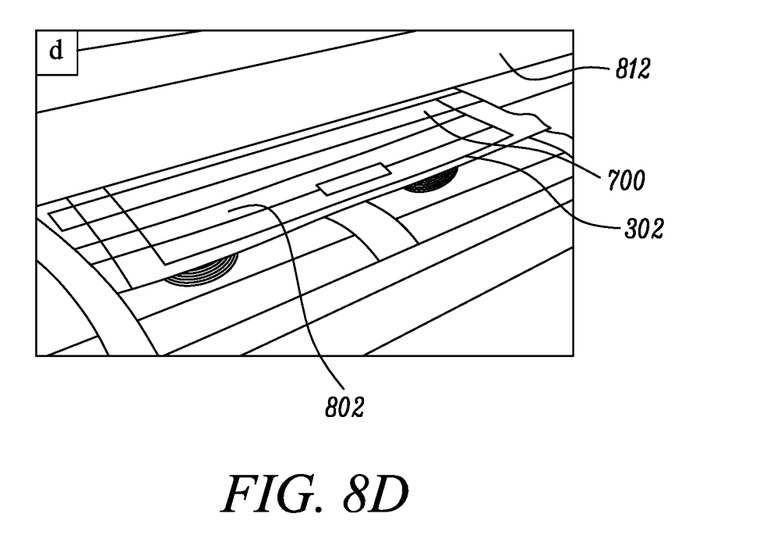

In the fourth step 608, the continuous reinforcing patch 700 is pressed onto the masking film 802, specifically, at the location of the discontinuous cut-out 804. In order to minimise any lateral movement of the continuous reinforcing patch 702 during pressing, the continuous reinforcing patch 702 is secured to the masking film 802 and base layer 302 through applying adhesive tape 810 across the substrate 704 from which the continuous reinforcing patch 700 is provided (see FIG. 8C). The base layer 302, masking film 802 and continuous reinforcing patch 700 are then fed through a heated roller 812 (at a temperature of approximately 68° C. and feed rate of 600 mm/min) to transfer CNTs from the substrate 704 and on to the base layer 302 (see FIG. 8D). By pressing the continuous reinforcing patch 700 against the masking film 802, CNTs located at/over the removed sections of the masking film 802 (i.e. the discontinuous cut-out 804) are able to pass through the masking film 802 and on to the surface of the base layer 302, where they adhere to the tacky surface of the polymeric material of the base layer 302. On the other hand, CNTs located away from the discontinuous cut-out 804 are blocked from making contact with the base layer 302 and so are inhibited from transferring on to the base layer 302.

Figure 5B:
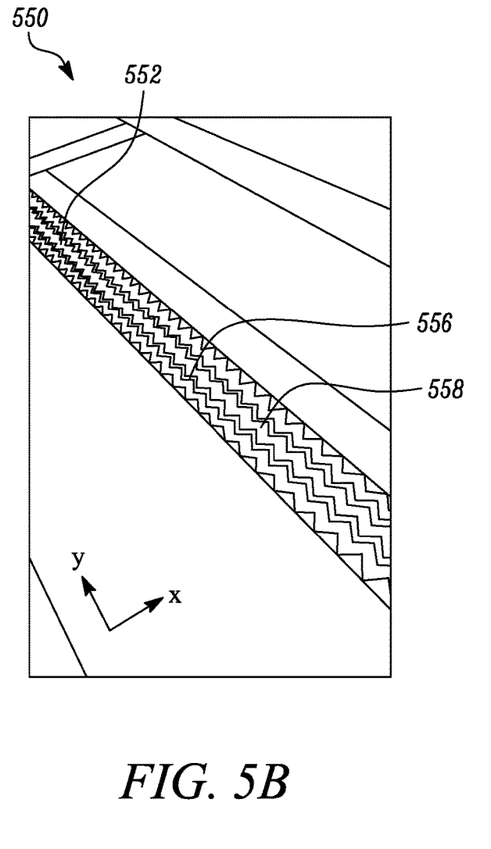
FIG. 5B is a top perspective view of a partly formed composite laminate with a discontinuous reinforcing patch comprising a chevron pattern.

In the fifth step 610, the masking film 802 (and the substrate 704) are removed from the base layer 302. Since only the CNTs located at the discontinuous cut-out 804 of the masking film 802 deposit and remain on the surface of the base layer 302, a discontinuous (patterned) reinforcing patch 304 is now provided on the surface of the base layer 302. Examples of different discontinuous reinforcing patches 304 on the base layer 302 are shown in FIGS. 3 and 5.

In a sixth step 612, a top layer (not shown) formed of a polymeric material (in this case, another layer of HexTow® IM7/HexPly® 8552 prepreg) is provided over the base layer 302 and discontinuous reinforcing patch 304. Resultantly, the discontinuous reinforcing patch 304 interposes the base layer 302 and top layer, or in other words, the discontinuous reinforcing patch 304 forms and interlayer between the base layer 302 and top layer.

To minimise the possibility of trapped air between the base layer 302 and top layer, the laminate 300 can be debulked under vacuum for at least 10 minutes. The laminate is then be room cured, oven cured, or autoclave cured. The type of cure selected will depend on the polymeric material of the base layer 302 and top layer, and the desired mechanical properties of the laminate 300.

It will be understood that this disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of manufacturing a composite laminate, the method comprising the steps of:
   providing a base layer formed from polymeric material;
   providing a continuous reinforcing patch on the base layer;
   processing the continuous reinforcing patch to form a discontinuous reinforcing patch on the base layer, the discontinuous reinforcing patch comprising a patterned nanomaterial layer having at least one nanomaterial-filled zone and at least one vacant zone, wherein the nanomaterial layer in the at least one nanomaterial-filled zone comprises a plurality of aligned carbon nanotubes, and wherein processing the continuous reinforcing patch comprises:
      providing a masking film on the base layer, the masking film including a discontinuous cut-out;
      pressing the continuous reinforcing patch on the masking film, wherein nanomaterials in the continuous reinforcing patch transfer through the discontinuous cut-out and onto the base layer; and
      removing the masking film to leave the discontinuous reinforcing patch on the base layer; and
   providing a top layer formed of polymeric material over the base layer and discontinuous reinforcing patch such that the discontinuous reinforcing patch is interposed between the base layer and the top layer.

2. The method of claim 1, wherein the masking film is formed from fluorinated ethylene propylene release film.

3. The method of claim 1, wherein the plurality of carbon nanotubes in the at least one nanomaterial-filled zone have an average length between and including 5 µm to 60 µm.

4. The method of claim 1, wherein the at least one nanomaterial-filled zone has an irregular shape.

5. The method of claim 1, wherein the at least one nanomaterial-filled zone and the at least one vacant zone are arranged in an irregular pattern.

6. A method of manufacturing a composite laminate, the method comprising the steps of:
   processing a continuous reinforcing patch to form a discontinuous reinforcing patch, wherein the discontinuous reinforcing patch is disposed on a base layer that is formed from polymeric material, wherein the discontinuous reinforcing patch comprises a patterned nanomaterial layer having at least one nanomaterial-filled zone and at least one vacant zone, the at least one nanomaterial-filled zone comprising a plurality of aligned carbon nanotubes; and
   providing a top layer formed of polymeric material over the base layer and discontinuous reinforcing patch such that the discontinuous reinforcing patch is interposed between the base layer and the top layer.

7. The method of claim 6, wherein the plurality of aligned carbon nanotubes have an average length between and including 5 µm to 60 µm.

8. The method of claim 6, wherein the continuous reinforcing patch is processed to form the discontinuous reinforcing patch prior to being disposed on the base layer.

9. The method of claim 6, wherein the continuous reinforcing patch is processed to form the discontinuous reinforcing patch in situ on the base layer.

10. The method of claim 6, wherein a central axis of the plurality of aligned carbon nanotubes is approximately perpendicular to the base layer and the top layer.

11. The method of claim 6, wherein the processing of the continuous reinforcing patch comprises etching or ablation to form the vacant zones.

12. The method of claim 6, wherein the at least one nanomaterial-filled zone has an irregular shape.

13. The method of claim 6, wherein the at least one nanomaterial-filled zone and the at least one vacant zone are arranged in an irregular pattern.

14. A method of manufacturing a composite laminate, the method comprising the steps of:
   providing a base layer formed from polymeric material;
   providing a continuous reinforcing patch on the base layer;
   processing the continuous reinforcing patch to form a discontinuous reinforcing patch on the base layer, the discontinuous reinforcing patch comprising a patterned nanomaterial layer having at least one nanomaterial-filled zone and at least one vacant zone, wherein the processing of the continuous reinforcing patch comprises etching or ablation to form the vacant zones; and
   providing a top layer formed of polymeric material over the base layer and discontinuous reinforcing patch such that the discontinuous reinforcing patch is interposed between the base layer and the top layer.

15. The method of claim 14, wherein the nanomaterial layer in the at least one nanomaterial-filled zone comprises a plurality of aligned carbon nanotubes.

16. The method of claim 15, wherein the plurality of carbon nanotubes in the at least one nanomaterial-filled zone have an average length between and including 5 µm to 60 µm.

17. The method of claim 14, wherein the continuous reinforcing patch is provided on a substrate, wherein etching or ablation comprises etching or ablating portions of the continuous reinforcing patch off of the substrate.

18. The method of claim 14, wherein the at least one nanomaterial-filled zone or the at least one vacant zone has an irregular shape.

19. The method of claim 14, wherein the at least one nanomaterial-filled zone and the at least one vacant zone are arranged in an irregular pattern.

* * * * *